US012307275B2

(12) United States Patent
Shpilyuck et al.

(10) Patent No.: US 12,307,275 B2
(45) Date of Patent: May 20, 2025

(54) FAST DISASTER RECOVERY IN THE CLOUD FOR VIRTUAL MACHINES WITH SIGNIFICANT MEDIA CONTENT

(71) Applicant: EMC IP Holding Company LLC, Hopkinton, MA (US)

(72) Inventors: Boris Shpilyuck, Ashdod (IL); Saar Cohen, Moshav Mishmeret (IL); Yossi Matatov, Rehovot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 16/910,728

(22) Filed: Jun. 24, 2020

(65) Prior Publication Data

US 2021/0406052 A1 Dec. 30, 2021

(51) Int. Cl.
*G06F 11/00* (2006.01)
*G06F 9/455* (2018.01)
*G06F 11/14* (2006.01)
*G06F 16/16* (2019.01)
*G06F 16/41* (2019.01)

(52) U.S. Cl.
CPC ...... *G06F 9/45558* (2013.01); *G06F 11/1451* (2013.01); *G06F 11/1464* (2013.01); *G06F 11/1469* (2013.01); *G06F 16/162* (2019.01); *G06F 16/41* (2019.01); *G06F 2009/45562* (2013.01); *G06F 2009/45583* (2013.01); *G06F 2009/45595* (2013.01); *G06F 2201/815* (2013.01)

(58) Field of Classification Search
CPC ............ G06F 9/45558; G06F 11/1451; G06F 11/1469; G06F 2009/45562; G06F 2201/815
See application file for complete search history.

(56) References Cited

U.S. PATENT DOCUMENTS

| | | | | |
|---|---|---|---|---|
| 8,332,689 | B2 * | 12/2012 | Timashev | ........... G06F 11/1469 718/1 |
| 2012/0179867 | A1 * | 7/2012 | Chakravarty | ........ G11B 27/329 711/111 |
| 2014/0187239 | A1 * | 7/2014 | Friend | ................... H04L 65/762 455/426.1 |
| 2017/0031783 | A1 * | 2/2017 | Kedem | ............... G06F 11/1471 |
| 2018/0024853 | A1 * | 1/2018 | Warfield | ............. G06F 9/45558 718/1 |
| 2018/0309841 | A1 * | 10/2018 | Hochberg | ............... H04L 69/22 |
| 2021/0406052 | A1 * | 12/2021 | Shpilyuck | ........... G06F 9/45558 |

* cited by examiner

*Primary Examiner* — Philip Guyton
(74) *Attorney, Agent, or Firm* — Workman Nydegger

(57) ABSTRACT

One example method includes processing a file of a VM to create a decreased quality file that is a version of the file, storing the decreased quality file at a recovery site along with metadata indicating a file type and path name for the decreased quality file, in response to a disaster recovery request, creating a partial user VM at the recovery site, and the partial user VM includes the decreased quality file, and with the partial user VM, serving the decreased quality file to a user in response to a request from the user.

18 Claims, 4 Drawing Sheets

FAST DISASTER RECOVERY IN THE CLOUD FOR VIRTUAL MACHINES WITH SIGNIFICANT MEDIA CONTENT

FIELD OF THE INVENTION

Embodiments of the present invention generally relate to disaster recovery of virtual machines. More particularly, at least some embodiments of the invention relate to systems, hardware, software, computer-readable media, and methods for improving disaster recovery for VMs with particular types of content.

BACKGROUND

Disaster recovery (DR) is a critical process for organizations. One of the most challenging aspects of disaster recovery is the time it takes to complete the recovery process. One approach for performing DR in a cloud environment is to create a user VM that performs the actual DR activity. That is, this approach involves creating disks of the same sizes as the disks of a protected VM, reading the segmented backup copies data from cloud storage, and then filling the disks with the relevant segmented data. After the disks are created and filled with relevant data, a new VM will be launched with those disks, thus completing the DR process. However, this approach is not well suited for all media types.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
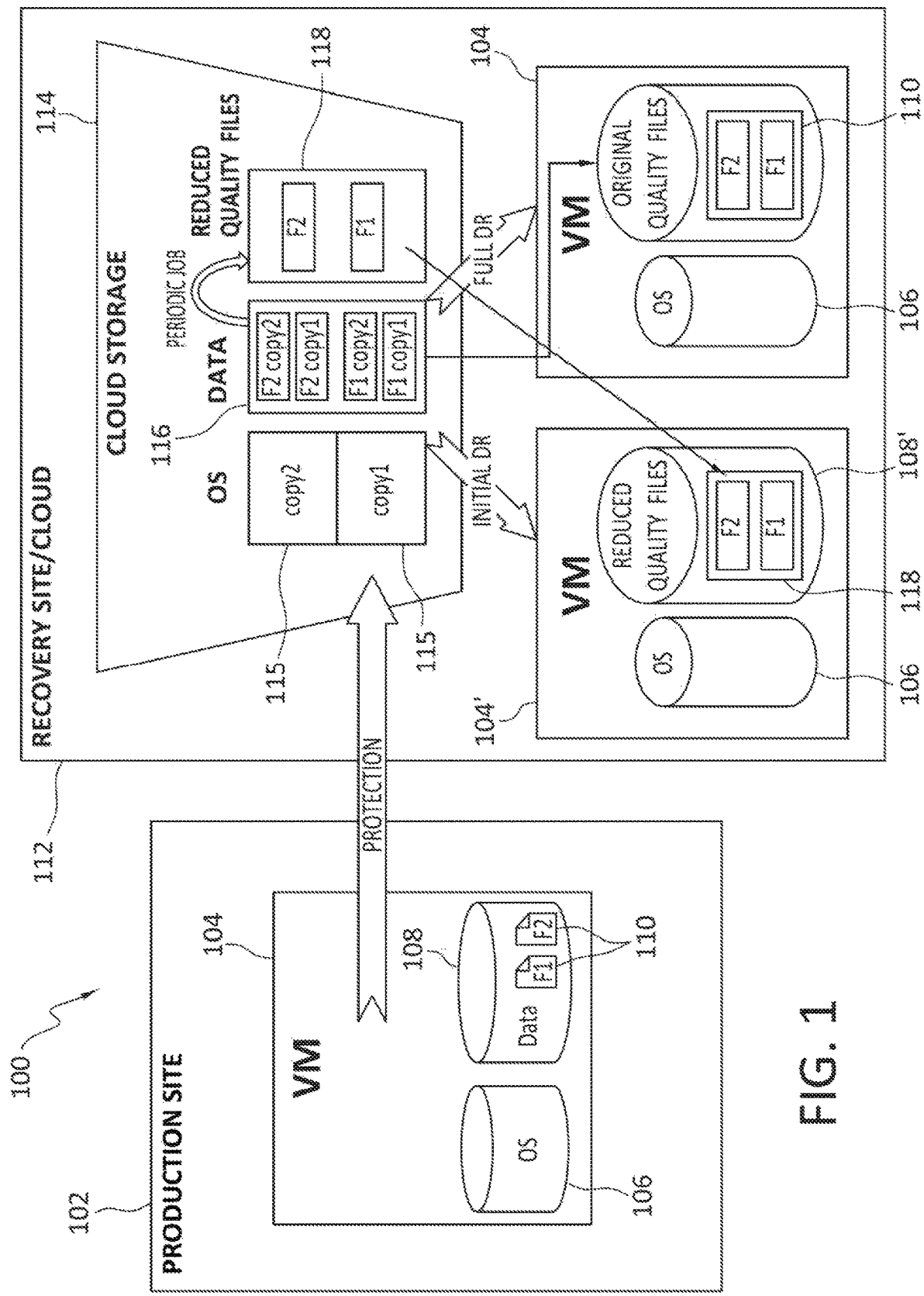
FIG. 1 discloses aspects of an example operating environment.

Embodiments of the present invention generally relate to data backup and restore processes. More particularly, at least some embodiments of the invention relate to systems, hardware, software, computer-readable media, and methods for improving disaster recovery for VMs with particular types of content, such as media content for example.

In general, example embodiments of the invention may improve the speed and efficiency of VM disaster recovery (DR) processes, such as by reducing the initial recovery time of a VM, through the use of reduced quality files, such as media files. In some embodiments, the quality of audio/video files that exist on a VM may be reduced, and the reduced quality files may be saved in cloud storage alongside the data of the files with the original quality.

When a DR process for a VM is initiated, the files with the reduced, or decreased, quality can be downloaded to the user VM at the recovery site faster than would be the case if full quality files were to be downloaded. This is because the audio/video files with decreased quality may be much smaller in size than the original files on which they are based. Moreover, in some use cases, such as recovery-test operations for example, the decreased quality files are adequate, and there may be no need to download the full-quality files to perform such operations. Use of the reduced quality files may enable the customer to perform such recovery-test, and/or other, operations relatively faster and less expensively than if original quality files were employed.

As well, the reduced quality files may be pre-saved during the VM DR process as full files, rather than simply file differentials (also referred to herein as 'diffs'). Once all decreased quality files have been be downloaded to the user VM at the recovery site, the initial recovery may be considered as complete and the decreased quality files, which may be adequate for some purposes, may be served to users. In the background, during and/or after download of the reduced quality files, the download of original quality files to the user VM may start/continue until all the decreased quality files have replaced with the original files. At this point, the DR process for the user VM may be considered as fully complete, and the user VM at the recovery site may be able to serve full quality files.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the initial recovery time may be improved, that is, shortened, for virtual machines (VM) with significant media content. An embodiment of the invention may provide for a VM DR process to be performed on a file level for media content, while the DR process for the VM operating system (OS) may be performed at a disk level.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations such as, but not limited to, disaster recovery (DR) operations, data read/write/delete operations, data deduplication operations, data backup operations, data restore operations, data cloning operations, and data archiving operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage and/or cloud computing environments in connection with which embodiments of the invention may be employed include, but are not limited to, Dell EMC Cloud, Microsoft Azure, Amazon AWS, and Google Cloud. More generally however, the scope of the invention is not limited to employment of any particular type or implementation of a cloud environment In addition to providing cloud storage and/or cloud computing functions, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Aspects of Some Example Embodiments

B.1 VM Protection

Many DR workloads may involve VMs with significant media content, examples of which include audio, video, CAD (computer aided design), and graphics, files. More so, the VMs that store media content may have a large number of files that may be very large in size. For such VMs, embodiments of the invention may enable the disaster recovery time to be significantly reduced. These files may already be stored in a format that is compressed and efficient storage-wise. However, these files may be re-encoded to produce a lower quality file of a significantly reduced size relative to the original file. Various programs may be used to reduce the size of media files and include, by way of illustration, VLC Media Player, iMovie, Windows Movie Maker, and Handbrake for Windows and MAC platforms. However, the scope of the invention is not limited to any particular platform for reducing the size of a media file, whether by changing the resolution of the media file and/or making any other changes to the media file.

One example of such a file type is an MKV (Matroska Video file) file that may have an .mkvfile extension. In general, an MKV file is a container file that may be similar, for example, to the .mov and .avi formats. MKV files may able to support a variety of audio and video codecs. The scope of the invention is not limited however, to any particular video file type, nor to any particular media type or media file. Other example media formats that may be employed in connection with embodiments of the invention include MP4, WMV, MPEG, H264, MP3, AVI, MOV, and WMA.

To illustrate, an MKV file with an HD resolution (1920*1080) may be re-encoded to reduce the resolution of the file. For example, such a file may be re-encoded to 960*540 resolution. In this example, the number of pixels is reduced 4×, and this will result in significant reduction in the size of the file. That is, the re-encoded file in this example includes 4× fewer pixels than the original quality file. The re-encoded file, while of reduced quality, may still be easily identified with the original content, and may be adequate for various uses. Note that no particular magnitude of the reduction of the size of a media file is required, and the 4× pixel example is provided only by way of illustration, and is not intended to limit the scope of the invention in any way.

File compression may also be employed to reduce the size of a media file and, in some instances, the fully quality of the original media file may be retained. As another example, a media file may be reduced in size by conversion to a different format, or file type, than the original version of the media file. In some cases, the bit rate and/or frame rate of a media file may be reduced in order to reduce the file size.

Embodiments of the invention may be well suited to deal with some of the complexities that may attend the performance of DR processes for VMs with significant media content. For example, backup files typically be stored as diffs, that is, each new backup of a media file may be storing only difference between a current state of that file and the previous state, such as may have resulted from a previous backup. These may sometimes be referred to as differential, or incremental, backups. However, algorithms for reduction of audio/video files quality may act upon full files, rather than differentials between files. Alternatively, while the full files may accessible inside the production VM, it may not be desirable to place an additional computing load, for file quality reduction, on those VM in order to achieve desired recovery optimization. Embodiments of the invention may be effective in addressing constraints such as these.

Further, disks of a VM that is mostly used to serve media files may include a significant amount of data that is not related to audio/video files, or other media files. As used herein, a VM may 'serve' a file when the VM makes that file accessible to a user, such as for read, copy, delete, and/or write, operations for example. Examples of such non-media files may include the OS itself, various executables, and config files. Performing a file level backup for all this data may be wasteful, and may not even be possible in some cases. Thus, for such non-media type data, it may be desirable implement a disk level protection process to protect the whole disk with all its content.

Note that, as used herein, 'media' files embrace files with a majority of content that comprises audio, video, and/or graphical, content, or any combination of the foregoing examples of content. 'Non-media' files embrace files with a majority of content that does not comprise audio, video, and/or graphical, content. Media files may be played back using audio, video, and/or other display, equipment and devices, while non-media files cannot be played back with such equipment and devices. Finally, a VM may be referred to as having 'significant' media content if a majority of the files on that VM, and/or a majority of the data (measured, for example, in MB or GB) on that VM, are media files/data.

Attention is directed now to FIG. 1 which discloses aspects of an embodiment in which DR protection is implemented for an OS disk of a production VM, and a file level backup created for data disks of the production VM. In general, in some example embodiments, the media files are located on one or more data disks but not on the boot (OS) disk. A periodic job may reconstruct full media files using the reduced quality files and the media file diffs. Upon initial DR, a user VM may be launched at a recovery site with reduced quality media files that are ready to be served, that is, made available to a client or other user. Upon full DR completion, the reduced quality media files may be replaced with the reconstructed original files. Thus, example embodiments of the invention may improve the disaster recovery time for VMs with significant media content (VSMC) by performance of various processes, examples of which are outlined in further detail below.

As shown in FIG. 1, one example configuration 100 may include a production site 102, which may be a cloud computing site or an enterprise premises for example, that includes one or more VMs 104 that may be protected. Each of the VMs 104 may perform various functions of a client, or clients. A VM 104 may include an OS disk 106, and one or more data disks 108 that may each include one or more media files 110. The production site 102 may communicate with a recovery site 112, which may comprise a cloud storage 114 site for example, and backups of the VMs 104 may reside at the recovery site 112.

In at least some embodiments, the protection of the OS disk 106 may be performed for the whole disk. Each subsequent backup of the OS disk 106 may only store the diff 115 in the cloud storage 114, such as in the form of one or more data segments, between itself and the previous backup.

In contrast with the OS disk 106, which may be protected at the disk level, protection of the data disk 108 may be performed at the file level. This may be referred to as performing a file level backup of the data disk 108. As such, in some embodiments, it may be the case that not all of the files on the data disk 108 are protected, and/or it may be the case that the media files 110 may be processed independently of any non-media files on the data disk 108. For each file 110, the diff between the current backup (copy2) and the previous backup (copy1) may be stored in the cloud storage 114 of the recovery site 112. For example, for file F2, the differences between 'F2 copy2' and 'F2 copy1' may be stored in cloud storage 114. Note that while full copies of the files 110 F1 and F2 are indicated in FIG. 1, those full copies are not backup copies, since as noted above only diffs are stored, but are rehydrated copies created as described below.

In addition to the differences, the file 110 metadata indicating, for example, the file type and location (file path) may also be saved at the recovery site in association with the diffs. In some embodiments, storage of the file 110 metadata may be supported through either a backup agent deployed on the VM itself, which may know how to track the files 110 and backup their differences, or by backing up the entire data disk 108 and indexing the data disk 108 later to detect the files in the backup. In either case, the various files 110 may be kept in independent objects in the cloud storage 114, so that the files 110 can be processed independently of the rest of the data disk 108 contents.

With continued reference to FIG. 1, a rehydration job may run periodically, or on some other basis, in the cloud storage 114 to create full media files 116 from the chain of diffs that were stored for each of the backed up files 110. The rehydration job may also create a respective decreased quality version of one or more of the files 116, and then store the decreased quality files 118 in the cloud storage 114. As noted herein, the quality reduction of a file such as a media file may be achieved, for example, by reducing the resolution of the file, although any other process for reducing the quality of a file, while preserving those file attributes needed to perform processes such as recovery-test operations, may be employed in some embodiments.

In connection with the creation and storage of the reduced quality files 118, the file 110 metadata for the files may be updated with the location in the cloud storage 114 of the decreased quality file 118. The full original quality file 116, used in the processing flow, may be deleted after creation of the reduced quality files 118, although the file diffs may be retained for use in creating the full file 110 backup later.

Finally, as shown in FIG. 1, a VM 104' may be created at the recovery site 112, such as in response to a DR request, that includes the boot (OS) disk 106 that has been backed up, and that includes a data disk 108' with the reduced quality files 118. This VM 104' may begin enabling access to the reduced quality files 118 at the recovery site 112. At this point, the initial recovery may be considered as complete. During and/or after creation of the VM 104' at the recovery site 112, the original files 110 may be restored, such as by an agent, to the VM 104', thereby restoring the full VM 104, or user VM, at the recovery site 112, such that the full files 110 at the recovery site 112 are made accessible to a user. The reduced quality files 118 may be removed, by the agent for example, from the VM 104' as the original files 110 are restored to the VM 104'.

Thus, an example DR process may be considered as having, in some embodiments, a first phase in which the VM 104' is initially created at the recovery site 112, such as in response to a DR request, and a second phase in which the VM 104' is subsequently updated with full files and thus becomes a full copy of the VM 104. This full copy of the VM 104 that is created at the recovery site 112 may be referred to herein as the user VM. Thus, the VM 104' and VM 104 shown at the recovery site 112 are two different states of the same user VM.

Figure 2:
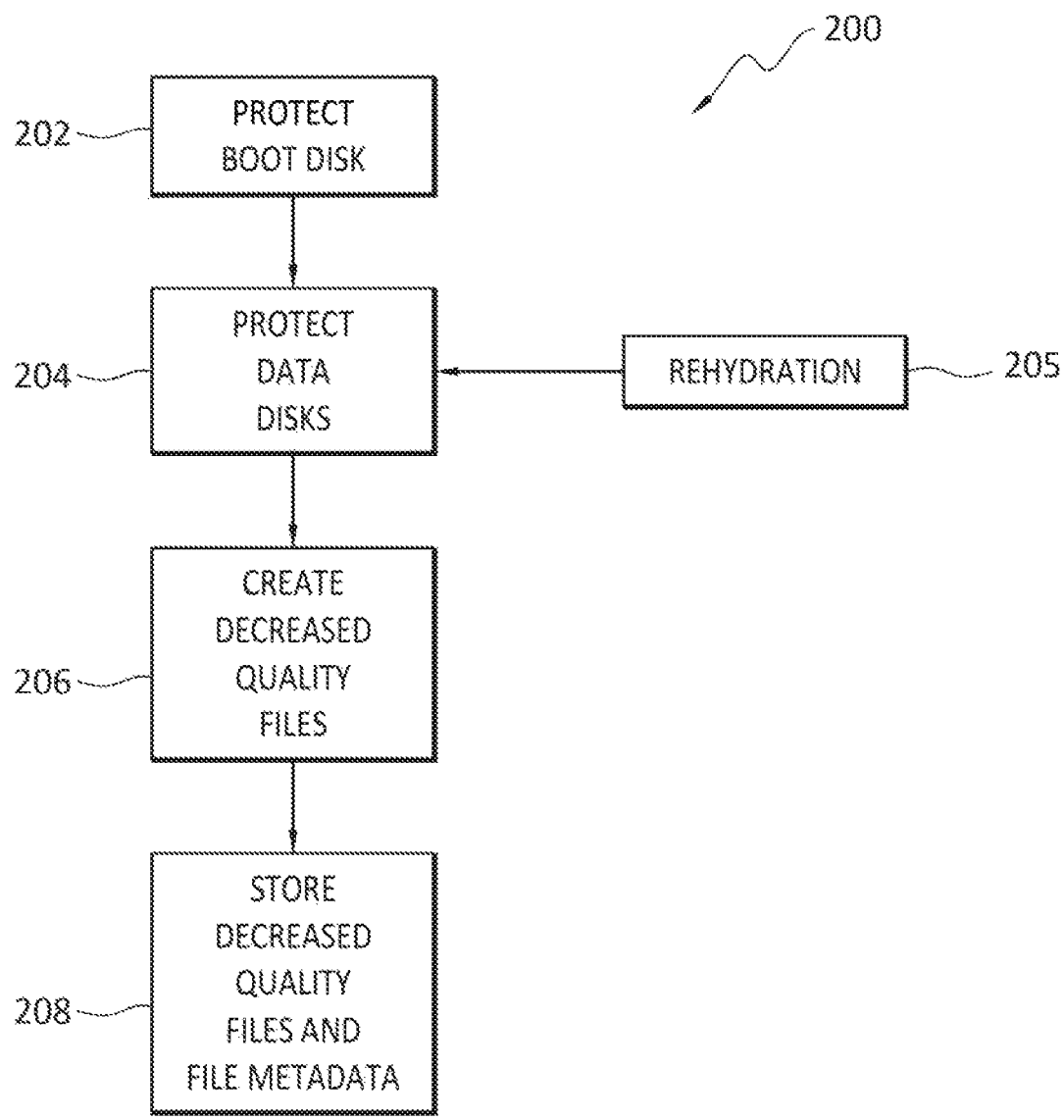
FIG. 2 discloses aspects of an example method for protection of VM disks.

With continued reference to FIG. 1, and directing attention now to FIG. 2 as well, some embodiments of the invention may provide for VM protection process. It is noted that the scope of the invention is not limited to this example approach to VM protection. Thus, the following discussion is presented by way of example only.

In FIG. 2, aspects of methods for DR are disclosed, where one example method is generally denoted at 200. It is noted with respect to the example method of FIG. 2, as well as to any of the other disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

With particular reference now to FIG. 2, one example embodiment of a VM protection process is denoted generally at 200. The method 200 may be performed in part, or in whole, at a recovery site, such as a cloud storage site for example. Part or all of the method 200 may be performed in response to a request from an entity at a production site, such as an administrator for example, and/or in response to a request from a backup/restore server that may reside at a production site, a recovery site, or elsewhere.

The method 200 may begin with protection of a boot disk 202 of a user VM, such as by backing up the boot disk at a recovery site for example. Such protection may be performed for the entire boot disk, that is, the recovery may be performed at the disk level. Subsequent backups of the boot disk may store, at the recovery site, only differentials between the most recent backup, and the previous backup(s) of the boot disk.

After protection of the boot disk 202, the data disk(s) of the user VM may be protected 204. In one example data disk protection 204 process, the data disks are protected 204 on a file level basis by a file level backup, that is, one or more individual files on the disk, rather than the entire disk, may be selected for backup. In general, for each file that is protected, a diff between the current backup of that file and previous backup(s) of that file may be stored in cloud storage. Protection of the data disks 204 may also comprise saving file metadata that indicates, for example, the file type and the file location in the cloud storage, such as the file path for example. The file metadata may be stored in the cloud storage in association with the diffs. Since the diffs are saved, and the file locations and types are known, the full files may be reconstructed when needed.

In some embodiments, a periodic rehydration job may run 205 that creates a full file from a chain of diffs that have been stored for that file. This process may be referred to as rehydration. The newly created full file may then be stored at the recovery site, and the diffs used to create the full file may be deleted. Subsequent changes to the new full file may be stored as diffs until rehydration is performed again. By running this job periodically, the time needed to create a full file, on which decreased quality files may be based, may be reduced, since some of the diffs have already been incorporated into the full file. If a full file were only created at the time that a decreased quality file was needed, the rehydration of that full file may take a significant amount of time depending upon the number of diffs that might have to be applied.

The full files of the protected data disk(s) may then be used as a basis to create respective decreased quality files 206. In some embodiments, creation of the decreased quality files 206 comprises reducing the resolution of those files to an extent that the decreased quality files are still usable for some purposes. The decreased quality files, and file metadata concerning those decreased quality files, such as file type and pathname, may then be stored 208 in the cloud storage where they are accessible for future initial, and full, DR operations.

B.3 VM Disaster Recovery

Figure 3:
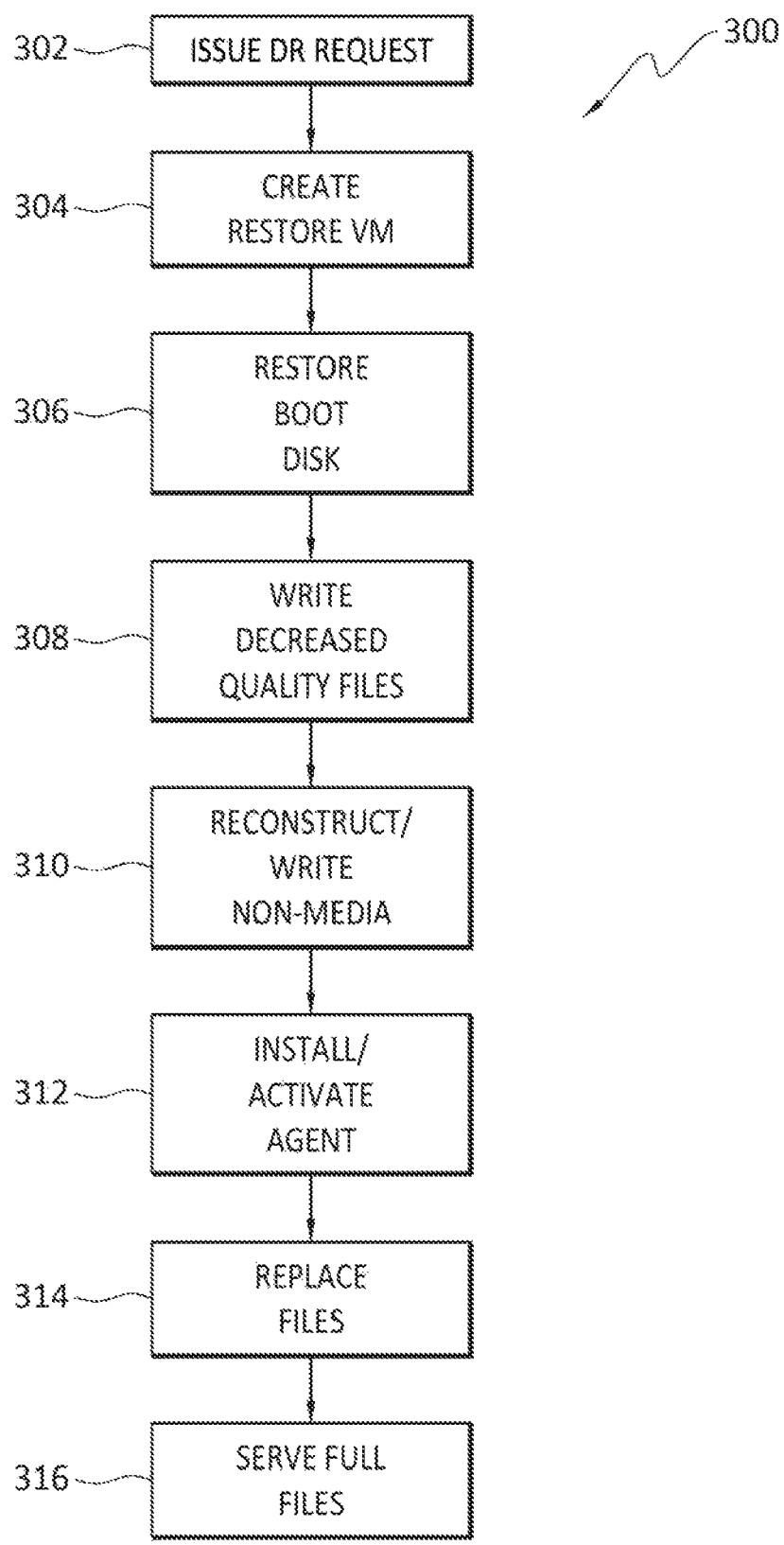
FIG. 3 discloses aspects of an example method for disaster recovery of a VM.

With continued reference to FIG. 1, and directing attention now to FIG. 3 as well, some embodiments of the invention may provide for an initial disaster recovery process, optionally followed by a full disaster recovery process. However, the scope of the invention is not limited to this example approach to DR. Thus, the following discussion is presented by way of example only. In general, FIG. 3 embraces DR processes that may be performed, for example, at a recovery site. In response, for example, to a DR request that may be issued when a production site goes down or is otherwise experiencing problems that prevent access to files of a production VM, a user with those files may be created at the recovery site. Once created, the user VM may be able to serve reduced quality files and/or full quality files from the recovery site.

That is, the method may involve recovery of files, an OS, and other information to a user VM at the recovery site. In some instances, the initial DR process may be significantly shorter than the full DR process. In one particular example, an initial DR process may take about 2 hours, while the corresponding full DR process may take about 12 hours.

The example method 300 may begin when a disaster recovery request is issued 302. The request may be issued 302 by an entity at the production site 102, or elsewhere, to the recovery site 112. Such an entity may be, for example, a client at the production site, a backup/restore server, or an administrator, for example. In response to the request 302, the user VM may be created 304 at the recovery site with the same disks, which may initially be empty, as the disks of the original production VM.

After the user VM is created 304, the boot (OS) disk may be recovered 306 to the user VM. The recovery 306 of the OS disk may comprise recovery of some, or all, of the OS disk segments from a recovery site, and then writing the recovered segments to the appropriate locations on the OS disk.

One, some, or all, of the decreased quality media files may then be written 308 to appropriate locations on the user VM data disk(s). The other files, such as non-media files for example, may be reconstructed 310 on the user VM using the diff chains stored at the recovery site. Once all the disks/files are processed as explained at 302-310, the initial recovery may be considered as complete, and decreased quality files will be available at the recovery site for consumption by clients. For example, the decreased quality files may be accessible by clients for various purposes and uses, examples of which are disclosed herein.

In some embodiments, completion of the initial recovery may automatically trigger performance of the full recovery, although that is not necessarily required. In some embodiments, only the initial recovery is performed, and the full recovery may be omitted. In some embodiments, only the initial recovery is performed for one or more files of a VM while, for one or more other files of that same VM, a full recovery is performed. In some embodiments, an initial recovery only is performed for one or more VMs, while a full recovery is performed for one or more other VMs, and all of the VMs may, or may not be, associated with the same entity or user.

At any point during any one or more of the processes 302-310, or afterward, a software agent may be installed and activated 312 on the user VM at the recovery site. Among other things, the agent may replace 314, on the user VM, one or more of the decreased quality media files with the corresponding original file. In some embodiments, where a backup agent was used to protect the VM, the same backup agent may perform part, or all, of the restore processes 304-314, including the file replacement 314 process.

In more detail, at 314, the agent may trigger the recreation of the original quality media files from the diff chains and may download each such recreated original file to the appropriate location in the user VM. The file locations may be determined from the file metadata that was stored at the recovery site in connection with the decreased quality files. Once all files have been processed in this way, the agent may be terminated and a full recovery may be considered as completed. The user VM at the recovery site may now serve 316 original quality files to the users.

B.4 Example Optimizations and Prioritization

In some embodiments, the operations of processing the files to produce the lower-quality files, and the recovery of full-quality files to the VM itself, may be resource-consuming and lengthy. Thus, in some embodiments, these tasks may be prioritized relative to each other. For example, actions that generate the most value may be performed first, and then the remaining actions may be performed.

To illustrate, creation of the decreased quality files 206 may be performed as follows. First, the media files of the protected VM that are stored at the recovery site may be listed. The listed files may then be ordered according to the size reduction expected to be achieved after performing quality reduction. For example, reducing the quality of a 4K video file that may save gigabytes of data may be ranked higher in priority than reducing the quality of an SD video file that may save only hundreds of megabytes of data. Once the priorities have been established for implementing the quality reduction processes, the quality reduction tasks may then be performed in the specified order.

A similar approach involving listing and/or prioritization may be taken with regard to rehydrating the full files on the user VM that was created at the recovery site. For example, the process may first rehydrate the files that are easier to update, given that the change may be relatively smaller in size. This may create a situation where the user has access to more original-quality files sooner, although those files may be relatively smaller than other as-yet unrestored files, and may defer the handling of the heavy, resource-consuming files to the end. This approach may be modified according to user preference. In some embodiments, the decision may be made not to perform any full-quality recovery at all if the user is only performing, for example, a recovery test, and can perform the full operation using only the decreased quality files. In some embodiments, some, but not all, full quality files may be restored, such as files that are of particular interest to a user.

C. Further Example Embodiments

Following are some further example embodiments of the invention. These are presented only by way of example and are not intended to limit the scope of the invention in any way.

Embodiment 1. A method, comprising: processing a file of a VM to create a decreased quality file that is a version of the file; storing the decreased quality file at a recovery site along with metadata indicating a file type and path name for the decreased quality file; in response to a disaster recovery request, creating a partial user VM at the recovery site, wherein the partial user VM includes the decreased quality file; and with the partial user VM, serving the decreased quality file to a user in response to a request from the user.

Embodiment 2. The method as recited in embodiment 1, wherein the file is a media file.

Embodiment 3. The method as recited in any of embodiments 1-2, wherein processing the file comprises reducing a resolution of a media file.

Embodiment 4. The method as recited in any of embodiments 1-3, further comprising, in response to the disaster recovery request, restoring a backup of an OS disk of the VM to the partial user VM.

Embodiment 5. The method as recited in any of embodiments 1-4, further comprising replacing, in the partial user VM, the reduced quality file with a full quality version of the file that was the basis for creation of the reduced quality file, and serving the full quality version.

Embodiment 6. The method as recited in any of embodiments 1-5, wherein the file of the VM is created using an earlier version of the file and one or more diffs that were stored at the recovery site after the earlier version was stored at the recovery site.

Embodiment 7. The method as recited in any of embodiments 1-6, wherein creation of the decreased quality file is performed before, or after, creation of another decreased quality file, according to a prioritization scheme.

Embodiment 8. The method as recited in any of embodiments 1-7, wherein the file of the VM is stored at the recovery site as part of a file level backup of a data disk of the VM, and an OS of the VM is stored at the recovery site as part of a disk level backup of a boot disk of the VM.

Embodiment 9. The method as recited in any of embodiments 1-8, wherein the file of the VM is deleted from the recovery site after the decreased quality file is created.

Embodiment 10. The method as recited in any of embodiments 1-9, wherein the method is performed at the recovery site.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
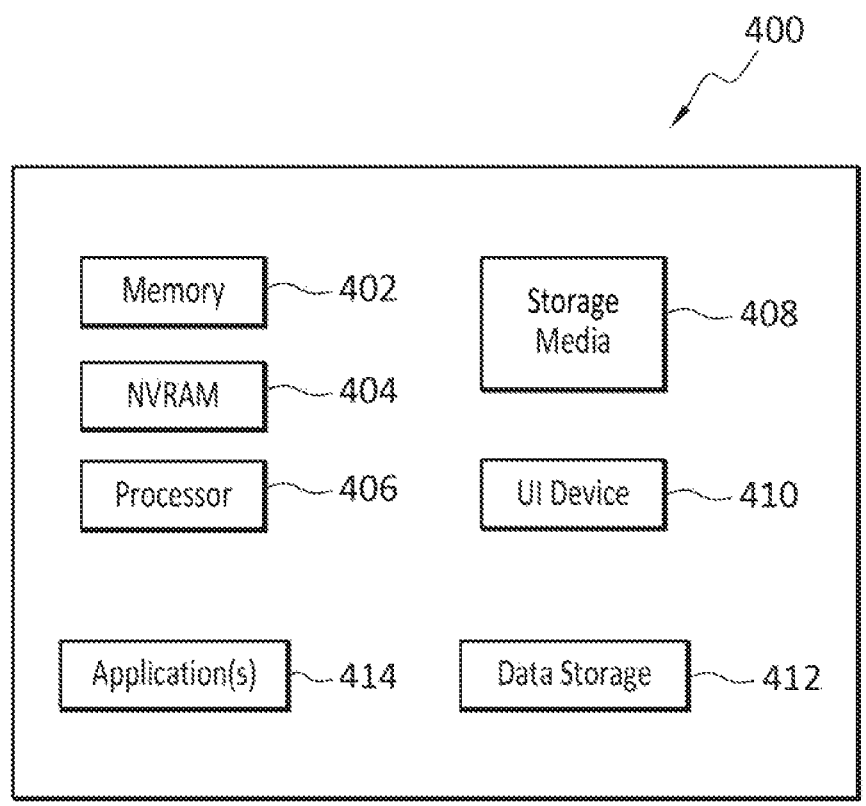
FIG. 4 discloses aspects of an example computing entity.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile random access memory (NVRAM) 404, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, by a recovery site, a media file with a backup request from a production site;
   processing, by the recovery site, a media file of a virtual machine (VM) to create a decreased quality file that has a lower quality than a quality of the media file;
   storing the decreased quality file at the recovery site along with metadata indicating a file type and path name for the decreased quality file, wherein the decreased quality file is stored along with the media file that was used to create the decreased quality file;
   in response to a disaster recovery request, creating a partial user VM at the recovery site, wherein the partial user VM includes the decreased quality file;
   with the partial user VM, serving the decreased quality file to a user in a first phase in response to the disaster recovery request from the user;
   installing and activating an agent on the partial user VM in a second phase; and
   replacing, by the agent, the decreased quality file with a full quality version of the media file in the partial user VM, wherein the partial user VM becomes a full copy of the VM.

2. The method as recited in claim 1, wherein the media file includes an audio and a video.

3. The method as recited in claim 1, wherein processing the media file comprises reducing a resolution of the media file.

4. The method as recited in claim 1, further comprising, in response to the disaster recovery request, restoring a backup of an OS disk of the VM to the partial user VM.

5. The method as recited in claim 1, further comprising:
   serving the full quality version.

6. The method as recited in claim 1, wherein creation of the decreased quality file is performed before, or after, creation of another decreased quality file, according to a prioritization scheme.

7. The method as recited in claim 1, wherein the file of the VM is stored at the recovery site as part of a file level backup of a data disk of the VM, and an OS of the VM is stored at the recovery site as part of a disk level backup of a boot disk of the VM.

8. The method as recited in claim 1, wherein the media file of the VM is deleted from the recovery site after the decreased quality file is created.

9. The method as recited in claim 1, wherein the method is performed at the recovery site.

10. A non-transitory storage medium having stored therein instructions that are executable by one or more hardware processors to perform operations comprising:
    receiving, by a recovery site, a media file with a backup request from a production site;
    processing, by the recovery site, a media file of a virtual machine (VM) to create a decreased quality file that has a lower quality than a quality of the media file;
    storing the decreased quality file at the recovery site along with metadata indicating a file type and path name for the decreased quality file, wherein the decreased quality file is stored along with the media file that was used to create the decreased quality file;
    in response to a disaster recovery request, creating a partial user VM at the recovery site, wherein the partial user VM includes the decreased quality file;
    with the partial user VM, serving the decreased quality file to a user in a first phase in response to the disaster recovery request from the user;
    installing and activating an agent on the partial user VM in a second phase; and
    replacing, by the agent, the decreased quality file with a full quality version of the media file in the partial user VM, wherein the partial user VM becomes a full copy of the VM.

11. The non-transitory storage medium as recited in claim 10, wherein the media file includes an audio and a video.

12. The non-transitory storage medium as recited in claim 10, wherein processing the media file comprises reducing a resolution of the media file.

13. The non-transitory storage medium as recited in claim 10, wherein the operations further comprise, in response to the disaster recovery request, restoring a backup of an OS disk of the VM to the partial user VM.

14. The non-transitory storage medium as recited in claim 10, wherein the operations further comprise:
    serving the full quality version.

15. The non-transitory storage medium as recited in claim 10, wherein creation of the decreased quality file is performed before, or after, creation of another decreased quality file, according to a prioritization scheme.

16. The non-transitory storage medium as recited in claim 10, wherein the file of the VM is stored at the recovery site as part of a file level backup of a data disk of the VM, and an OS of the VM is stored at the recovery site as part of a disk level backup of a boot disk of the VM.

17. The non-transitory storage medium as recited in claim 10, wherein the media file of the VM is deleted from the recovery site after the decreased quality file is created.

18. The non-transitory storage medium as recited in claim 10, wherein the operations are performed at the recovery site.

* * * * *